United States Patent [19]

Hayakawa

[11] Patent Number: 4,559,430
[45] Date of Patent: Dec. 17, 1985

[54] METHOD FOR PERFORMING AUTOMATIC CIRCUMFERENTIAL WELDING

[75] Inventor: Yoshitaka Hayakawa, Aichi, Japan

[73] Assignee: Mitsubishi Denki Kabushiki Kaisha, Tokyo, Japan

[21] Appl. No.: 658,241

[22] Filed: Oct. 5, 1984

[30] Foreign Application Priority Data

Oct. 7, 1983 [JP] Japan .................................. 58-187828

[51] Int. Cl.$^4$ .............................................. B23K 9/10
[52] U.S. Cl. .................................. 219/61; 219/60 R; 219/125.11
[58] Field of Search ........... 219/125.11, 125.1, 124.34, 219/60 R, 60 A, 137 R, 61; 318/685

[56] References Cited

U.S. PATENT DOCUMENTS 3,737,614 6/1973 Paulange ........................... 219/60 A
3,818,303 6/1974 Rossel .................................. 318/685
4,163,886 8/1979 Omae et al. ....................... 219/60 A

OTHER PUBLICATIONS

Dimetrics, Inc. publication, "Gold Track II Pipe Welding System-Model A", 3/3/1976.

Primary Examiner—Clifford C. Shaw
Attorney, Agent, or Firm—Sughrue, Mion, Zinn, Macpeak, and Seas

[57] ABSTRACT

A method for performing automatic circumferential welding around the circumference of a butt joint of a fixed pipe or the like. First, an initial set-up operation is performed wherein a welding head is moved around the welding circumference while producing pulses indicative of the amount of movement of the welding head. The number of pulses required to move the welding head one complete revolution is counted. Next, angles at which the welding conditions are to be changed are specified. These angles are converted to the form of pulses from a start point using the number of pulses previously counted. For the actual welding operation, pulses are again counted while moving the welding head. Each time the pulse count reaches one of the specified angles, a controller instructs a new set of welding conditions to the welding head.

4 Claims, 7 Drawing Figures

METHOD FOR PERFORMING AUTOMATIC CIRCUMFERENTIAL WELDING

BACKGROUND OF THE INVENTION

The present invention relates to a method for performing circumferential welding around the circumference of a butt joint of a fixed pipe or the like.

In recent years, the need for welding the circumferential joint portion of fixed pipes has increased. Accordingly, the automation of such welding is desirable in view of work efficiency, the quality of the weld, etc.

Generally, in the case where automatic full-circle circumferential welding is performed, the entire circumference is divided into several parts and predetermined welding conditions are specified for each of the respective parts so that the welding operation can be effected under the optimum welding conditions for the attitude of the welding torch.

A conventional welding control apparatus of this type is shown in FIG. 1. In FIG. 1, reference numeral 1 designates a pipe to be welded, 2 a guide rail concentrically mounted on the pipe 1, 3 a welding head running along the circumference of the guide rail 2, 4 a welding torch mounted on the welding head 3, and 5 a limit switch mounted on the welding head 4 and connected with a controller 7 through signal lines 6a and 6b. Reference numerals 8a, 8b, 8c and 8d designate dogs attached to the circumference of the guide rail 2. Reference numeral 9 designates a cable for applying welding data, such as the welding current, the number of revolutions of the welding head 3, etc., from the controller 7 to the welding head 3.

The operation of the apparatus will be described. Initially, the controller 7 is provided with a welding condition inputting device (not shown) with which it is possible to set all welding conditions required to perform circumferential welding. The guide rail 2 is attached to the pipe 1 in such a manner that one of the dogs 8a to 8d on the guide rail 2 coincides with a welding start point on the pipe 1. Next, on the assumption that the welding start point is at the dog 8a, the welding head 3 is set at a position which is slightly behind, in the normal welding direction, the welding start point.

When a welding start instruction is issued, the welding head 3 moves forwardly until the limit switch 5 detects the dog 8a, and when the dog 8a is detected, the controller 7 issues an instruction to the welding head 3 to cause the welding head 3 to temporarily stop. Then, the controller 7 outputs in succession data for welding condition no. 1 to cause the welding head to start welding. When the second dog 8b is detected, the controller 7 advances the welding condition by one step to the no. 2 condition while the welding head continues the welding operation. Similarly, the welding conditions are advanced step by step to the no. 3 condition, the no. 4 condition, etc. When the dog 8a is detected again, finish processing is performed, whereupon the welding operation is over.

In the conventional automatic welding control apparatus, either a combination of a limit switch and dogs (as described) or a contactless switch and appropriate position marking members is utilized. Particularly, the limit switch is accompanied by drawbacks in that it has a high failure rate and must be periodically replaced. Moreover, since the dogs are fixed to the guide rail, the detection points are fixed for one revolution of the welding head. It is therefore impossible to perform welding conditions step by step at optional points.

SUMMARY OF THE INVENTION

An object of the present invention is to eliminate the disadvantages of the prior art as described above.

In accordance with this and other objects, the present invention provides a method for performing automatic circumferential welding including the steps of first moving a welding head around the welding circumference while producing pulses in a number proportional to the amount of movement of the welding head in a welding direction; counting these pulses; specifying along the welding circumference a plurality of division points, in the operation of the form of respective angles from a start point, at which welding conditions are to change; converting the respective angles to the form of pulses from the start point; for a welding operation, moving the welding head around the welding circumference from a welding start point while counting pulses to detect the welding angle; comparing the pulse count with the respective angles in the form of pulses from the start point; and, when the pulse count reaches each of the respective angles from the start point, instructing to the welding head a new set of welding conditions.

Other objects, features, and advantages of the present invention will be apparent from the following description read in conjunction with the accompanying drawings.

DESCRIPTION OF THE PREFERRED EMBODIMENTS

Figure 1:
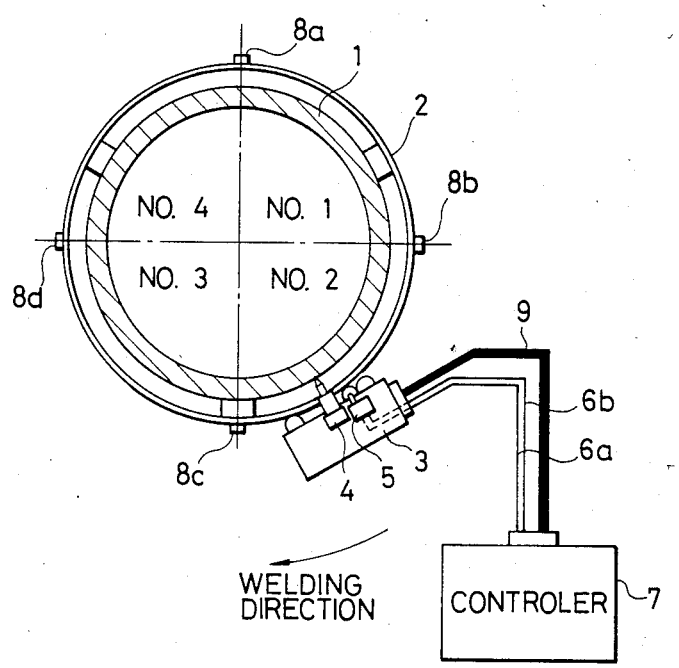
FIG. 1 is a diagram showing the arrangement of a conventional automatic circumferential welding apparatus.

Referring to the drawings, a preferred embodiment of the present invention will be described hereinafter.

Figure 2:
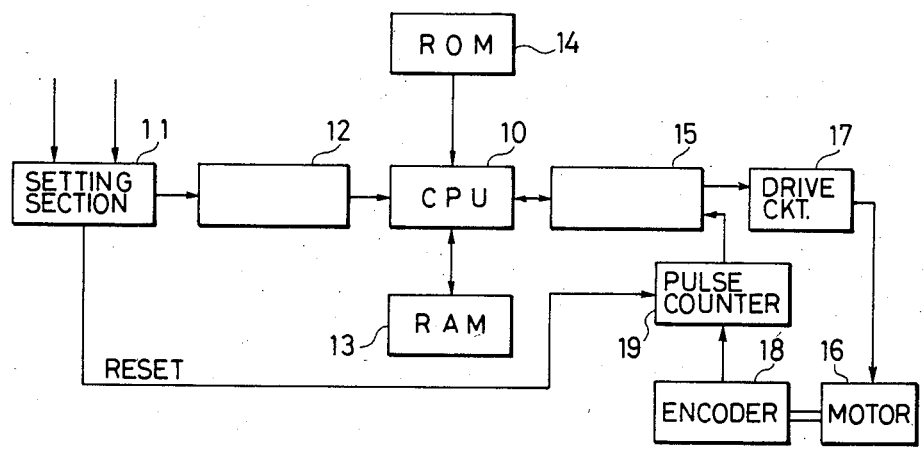
FIG. 2 is a block diagram showing a preferred embodiment of a welding apparatus of the present invention.
Figure 3:
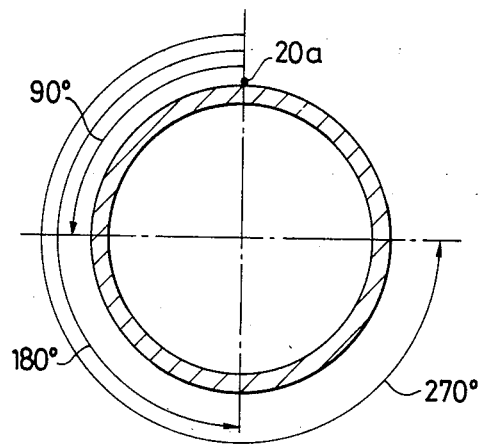
FIG. 3 is a diagram illustrating the operation of the apparatus of FIG. 2.
Figure 3:
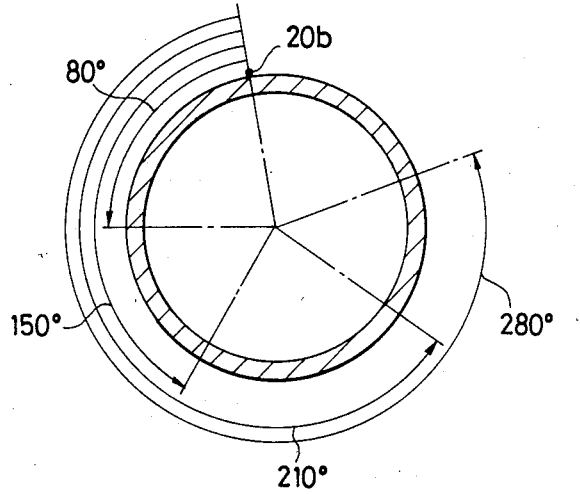

As shown in FIG. 2, a circumferential welding apparatus of the invention includes a CPU (central processing unit) 10, a setting section 11 for inputting various welding conditions and for setting angular positions at which the welding conditions are changed, an interface circuit 12 between the setting section 11 and the CPU 10, a RAM (random access memory) 13 for storing the welding conditions, a ROM (read only memory) 14 storing programs for performing the setting and storing of the welding conditions and for performing control operations relating to the welding operation, another interface circuit 15 between an external circuit and the CPU 10, a head drive motor 16, a drive circuit 17 for driving the head drive motor 16, an encoder 18 for generating pulses in proportion to the number of revolutions of the head drive motor 16, and a pulse counting circuit 19 for counting the pulses from the encoder 18. In FIG. 3, each of reference numerals 20a and 20b designates a welding start point.

Figure 4:
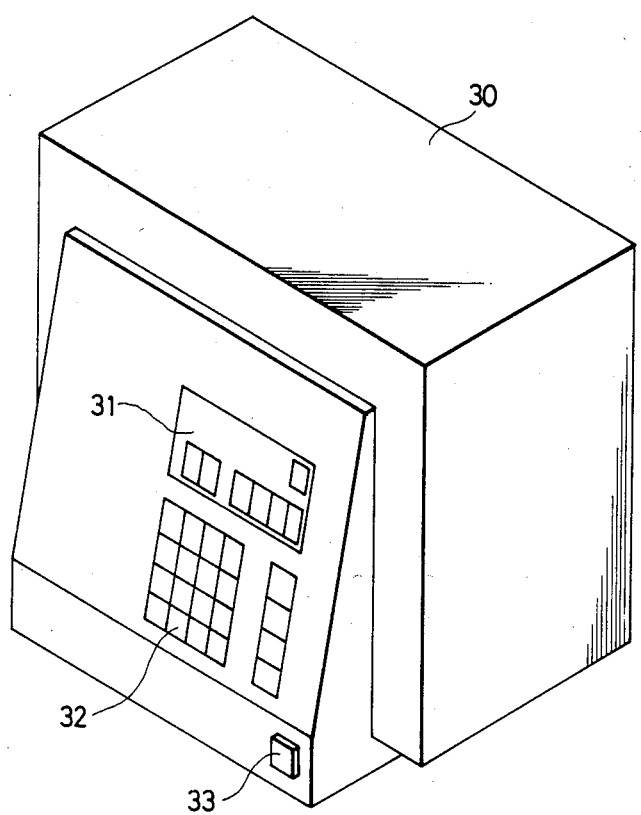
FIGS. 4 and 5 show controller arrangements.
Figure 5:
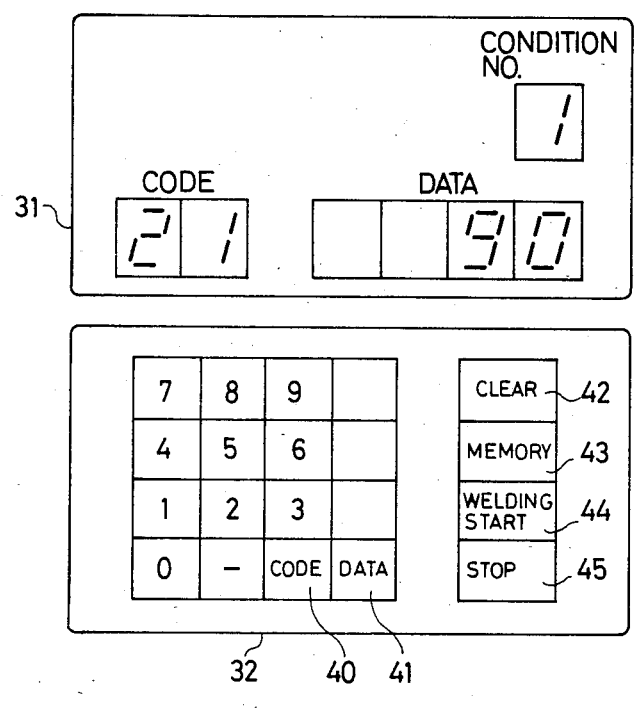

The various operational keys are arranged as shown in FIGS. 4 and 5. In FIG. 4, reference numeral 30 denotes the controller; 31, an indication section; 32, a setting key section; and 33, an electric power switch. These components are arranged on a front panel of the controller. FIG. 5 shows the indication section 31 and the setting key section 32. Reference numeral 40 denotes a code; 41, data; 42, a "clear" key; 43, a memory key; 44, a welding start key; and 45, a stop key.

The respective welding conditions are represented by the following codes:

| (a) | code 00 | welding current |
|---|---|---|
|  | code 01 | welding voltage |
|  | code 02 | welding speed |
|  | . | . |
|  | . | . |
|  | code 20 | condition advance angle |

(b) The above-conditions may be set in accordance with every condition No. (for example, 1 to 4). The condition No. represents each division of the circumference.

(c) The above conditions first designate the condition No. (division), and then designate the code No. to thereby carry out the data setting.

Figure 6:
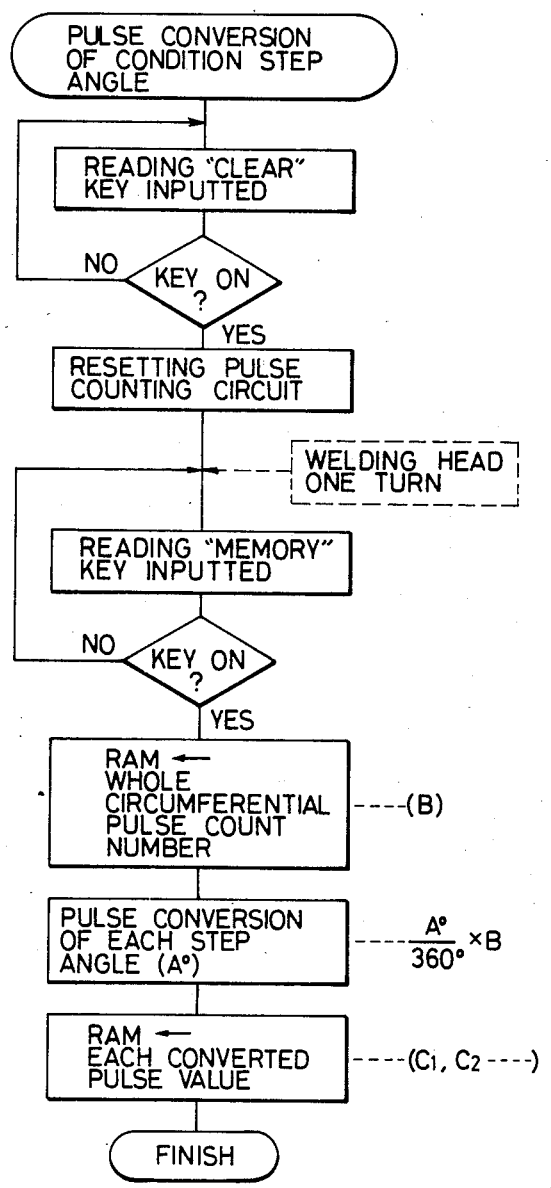
FIGS. 6 and 7 are flowcharts of the apparatus according to the present invention.
Figure 7:
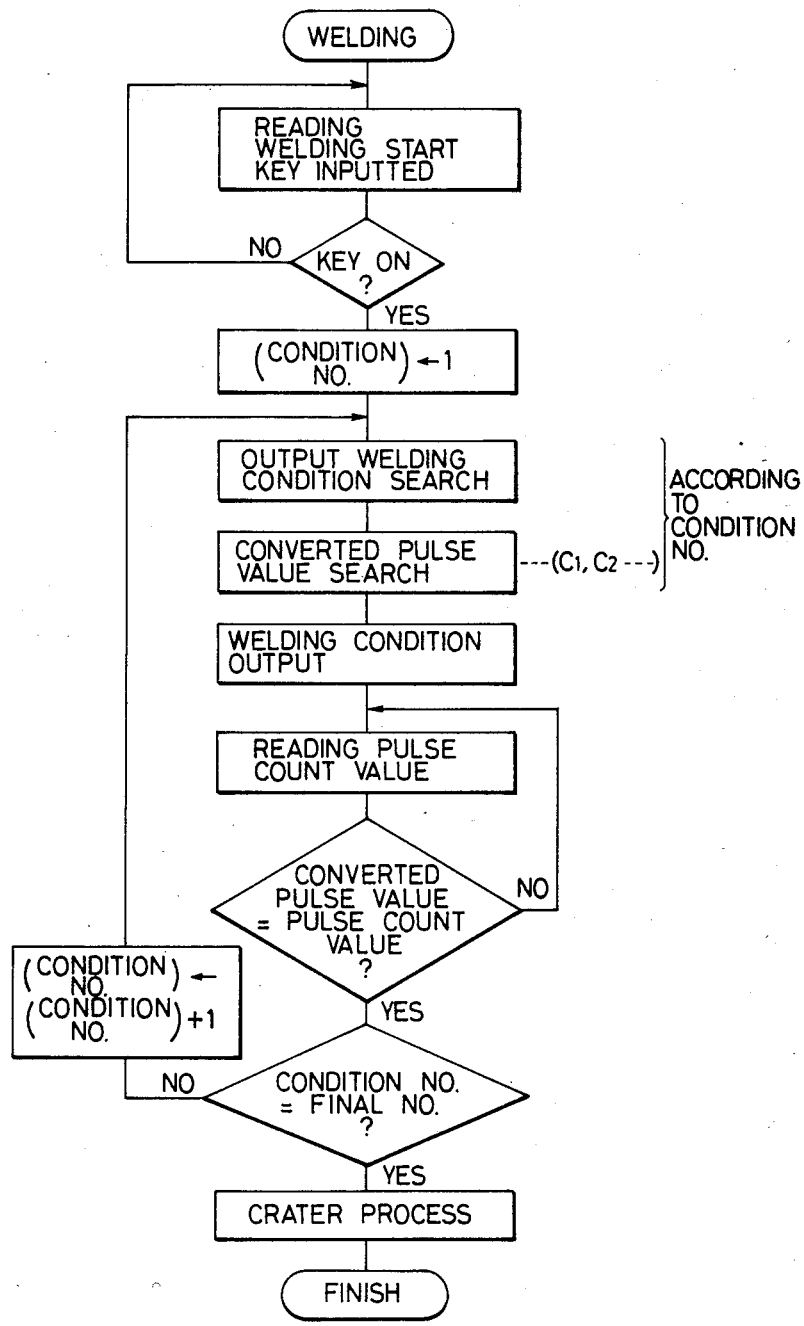

See FIGS. 6 and 7 showing the flowcharts of the system in accordance with the invention.

The operation of this apparatus will be described.

First, the division points at which the welding conditions change are given by angles from each of the welding start points 20a and 20b. The division points are inputted through the setting section 11. The angles can be selected anywhere within 360 degrees. The number of the division points is arbitrary. For example, if angles of 90 degrees, 180 degrees and 270 degrees are inputted, the entire circumference is divided into four equal parts. The welding conditions for the respective parts are also inputted through the setting section 11.

The inputted welding conditions are applied to the CPU 10 through the interface circuit 12 and stored in the RAM 13. Upon completion of inputting the welding conditions, a counting operation to count the number of pulses for the entire welding circumference is performed. For this, first the welding head is set such that a welding torch (not shown) mounted on the welding head coincides with the welding start point 20a or 20b. Upon completion of this setting, the "clear" key 42 as shown in FIG. 5 of the setting section is depressed to inform the CPU 10 of the fact that the welding torch is at the welding start point, and the pulse counting circuit 19 is reset. Then, the welding head is moved along the welding circumference, and when it reaches the welding start point 20a or 20b again, the "memory" key 43 shown in FIG. 5 of the setting section 11 is depressed so that the count of the number of pulses of the pulse counting circuit 19 at that time is applied to the CPU 10. The CPU 10 calculates the number of pulses for the respective angles which have been inputted on the basis of the count of pulses for one complete revolution in accordance with the following expression, and the result of this calculation is stored in the RAM:

number of pulses at an angle of A degrees =

$$\frac{A°}{360°} \times \text{number of pulses for entire circumference.} \quad (1)$$

If the welding operation starts with the welding torch coincided with the welding start point 20a or 20b, the pulse counting circuit 19 is reset and, simultaneously, the head drive motor 16 begins to rotate and the encoder 18 begins to output pulses to the pulse counting circuit 15.

The CPU 10 compares the previously determined number of pulses to the first division point with the present count of the number of pulses produced by the pulse counting circuit 19, and when coincidence occurs, advances the welding conditions by one step. This process continues until the welding torch returns to the last division point, that is, the welding start point, whereupon the CPU 10 instructs a finish processing operation to complete the welding operation.

Although the inputted division points are specified as absolute angles from the welding start point in the embodiment described above, they may be specified as relative angles with the same effect merely by slightly changing equation (1) described above. Further, although a separate pulse counting circuit 19 is provided in the embodiment described above, the same effect can be obtained if the CPU counts the pulses directly. Further, the same effect can be obtained by eliminating the encoder 18 and implementing the head drive motor 16 with a pulse motor.

According to the present invention, since the welding conditions are changed at pre-instructed division points as described above, it is not necessary to provide detection members such as dogs on a rail, it is possible to freely change the divison points, and it is possible to readily increase or decrease the number of division points.

I claim:

1. A method for performing automatic circumferential welding, comprising the steps of:
    A. performing an initial set-up operation by:
        (1) moving a welding head around a welding circumference while producing pulses in a number proportional to an amount of movement of said welding head in a welding direction around said circumference;
        (2) counting said pulses for one complete revolution of said welding head;
        (3) specifying along said welding circumference, in the form of angles from a start point, a plurality of division positions at which welding conditions are to change; and
        (4) converting said respective angles into the form of pulses from said start point; and
    B. for a welding operation:
        (1) moving said welding head around said welding circumference from said start point while producing pulses in a number proportional to an amount of movement of said welding head in said welding direction;
        (2) counting said pulses to produce a pulse count;
        (3) comparing said pulse count with said respective angles in the form of pulses from said start point; and
        (4) when said pulse count reaches each of said respective angles in the form of pulses from said start point, instructing to said welding head a new set of welding conditions.

2. The method of claim 1, wherein said steps of moving said welding head around said welding circumference comprise activating a drive motor associated with said welding head, and wherein said steps of counting said pulses comprise counting a number of revolutions of said drive motor.

3. The method of claim 1, wherein said steps of moving said welding head around said welding circumference comprise activating a pulse motor associated with said welding head by applying drive pulses thereto, and wherein said steps of counting said pulses comprise counting a number of said drive pulses applied to said step motor.

4. The method of claim 1, wherein said step of converting said respective angles to a form of pulses from said start point comprises dividing each of said respective angles by 360° and multiplying the result by the number of pulses counted in said initial set-up operation upon moving said welding head one complete revolution.

* * * * *